(12) United States Patent
Tankov et al.

(10) Patent No.: US 9,313,189 B2
(45) Date of Patent: Apr. 12, 2016

(54) AUTOMATIC MANAGEMENT OF SECURE CONNECTIONS

(71) Applicants:Nikolai D. Tankov, Sofia (BG); Petar D. Petrov, Sofia (BG); Petio Petev, Sofia (BG)

(72) Inventors: Nikolai D. Tankov, Sofia (BG); Petar D. Petrov, Sofia (BG); Petio Petev, Sofia (BG)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 13/939,414

(22) Filed: Jul. 11, 2013

(65) Prior Publication Data

US 2015/0020164 A1 Jan. 15, 2015

(51) Int. Cl.
*H04L 29/06* (2006.01)
*H04L 29/08* (2006.01)

(52) U.S. Cl.
CPC ............ *H04L 63/08* (2013.01); *H04L 63/0281* (2013.01); *H04L 67/141* (2013.01); *H04L 67/1097* (2013.01)

(58) Field of Classification Search
CPC ..... H04L 63/20; H04L 63/08; H04L 63/0272; H04L 63/0281
USPC ................... 726/4; 709/203, 228, 232; 714/4; 370/352, 395.53
See application file for complete search history.

(56) References Cited

U.S. PATENT DOCUMENTS

| 8,229,096 | B1 | 7/2012 | Marquis et al. | |
|---|---|---|---|---|
| 2005/0125553 | A1* | 6/2005 | Wu et al. | 709/233 |
| 2007/0038853 | A1* | 2/2007 | Day et al. | 713/153 |
| 2008/0082480 | A1 | 4/2008 | Gounares et al. | |
| 2009/0172463 | A1* | 7/2009 | Gatev et al. | 714/4 |
| 2009/0178132 | A1 | 7/2009 | Hudis et al. | |
| 2010/0169497 | A1* | 7/2010 | Klimentiev et al. | 709/228 |
| 2011/0154231 | A1 | 6/2011 | Cherdron et al. | |

(Continued)

FOREIGN PATENT DOCUMENTS

WO WO-2012042509 A1 4/2012

OTHER PUBLICATIONS

Liu, Tiancheng, et al. "Multi cloud management for unified cloud services across cloud sites." Cloud Computing and Intelligence Systems (CCIS), 2011 IEEE International Conference on. IEEE, 2011.*

(Continued)

*Primary Examiner* — Syed Zaidi
(74) *Attorney, Agent, or Firm* — Schwegman Lundberg & Woessner, P.A.

(57) ABSTRACT

In an example embodiment, on-premise systems have access to a cloud connector located on-premise. When the on-premise cloud connector is started, it may establish a secure connection to a notification service residing in the cloud. Applications running on the cloud have access to a connectivity agent. Cloud applications wishing to communicate with the on-premise systems send the communications through the connectivity agent. If a secure connection between the connectivity agent and the cloud connector does not exist, the connectivity agent sends a request to open a secure connection to the notification service. The notification service forwards the request to the cloud connector over its secure connection. The cloud connector may check the requested connection, and if authorized, open a secure connection to the connectivity agent. The connectivity agent then forwards the communication to the cloud connector, which then forwards it to the on-premise system.

12 Claims, 5 Drawing Sheets

(56) References Cited

U.S. PATENT DOCUMENTS

| | | | |
|---|---|---|---|
| 2011/0276713 A1* | 11/2011 | Brand | 709/232 |
| 2012/0124129 A1* | 5/2012 | Klimentiev et al. | 709/203 |
| 2012/0150792 A1 | 6/2012 | Yassin et al. | |
| 2012/0150940 A1* | 6/2012 | Kruempelmann et al. | 709/203 |
| 2012/0158821 A1 | 6/2012 | Barros | |
| 2012/0254431 A1 | 10/2012 | Kylau et al. | |
| 2012/0281706 A1* | 11/2012 | Agarwal et al. | 370/395.53 |
| 2013/0039360 A1* | 2/2013 | Manian et al. | 370/352 |
| 2013/0069950 A1* | 3/2013 | Adam et al. | 345/440 |
| 2013/0097320 A1 | 4/2013 | Ritter et al. | |

OTHER PUBLICATIONS

Liu, Feng, et al. "SaaS integration for software cloud." Cloud Computing (CLOUD), 2010 IEEE 3rd International Conference on. IEEE, 2010.*

"Executing RFCs from the Cloud", (May 4, 2012), 16 pgs.

Crowder, Darren, "SAP NetWeaver Cloud Platform", NetWeaver Cloud, Cloud Portal & Cloud Integration, (2012), 15 pgs.

* cited by examiner

AUTOMATIC MANAGEMENT OF SECURE CONNECTIONS

TECHNICAL FIELD

This disclosure relates to creating and managing secure connections between entities within separate networks. More particularly, this disclosure relates to establishing and managing secure connections between entities provided as part of a cloud service offering and entities within a private network.

BACKGROUND

Modern systems tend to rely on functionality provided on different systems and within different networks. The advent of cloud computing has allowed service providers to offer Infrastructure as a Service (IaaS), Platform as a Service (PaaS) and/or Software as a Service (SaaS) to IT departments and others within private networks. Taking advantage of these offerings typically means establishing secure connections between entities within private networks and entities within cloud networks in order to securely and privately exchange information. However, many of the presently used mechanisms expose such private networks on the Internet and open them to attacks of various types.

DETAILED DESCRIPTION

The description that follows includes systems, methods, techniques, instruction sequences, and computing machine program products of illustrative embodiments. In the following description and for purposes of explanation, numerous specific details are set forth in order to provide an understanding of various embodiments of the subject matter. However, it will be evident to those skilled in the art that embodiments of the subject matter may be practiced without these specific details. In general, well-known instruction instances, protocols, structures, and techniques have not been shown in detail.

Figure 1:
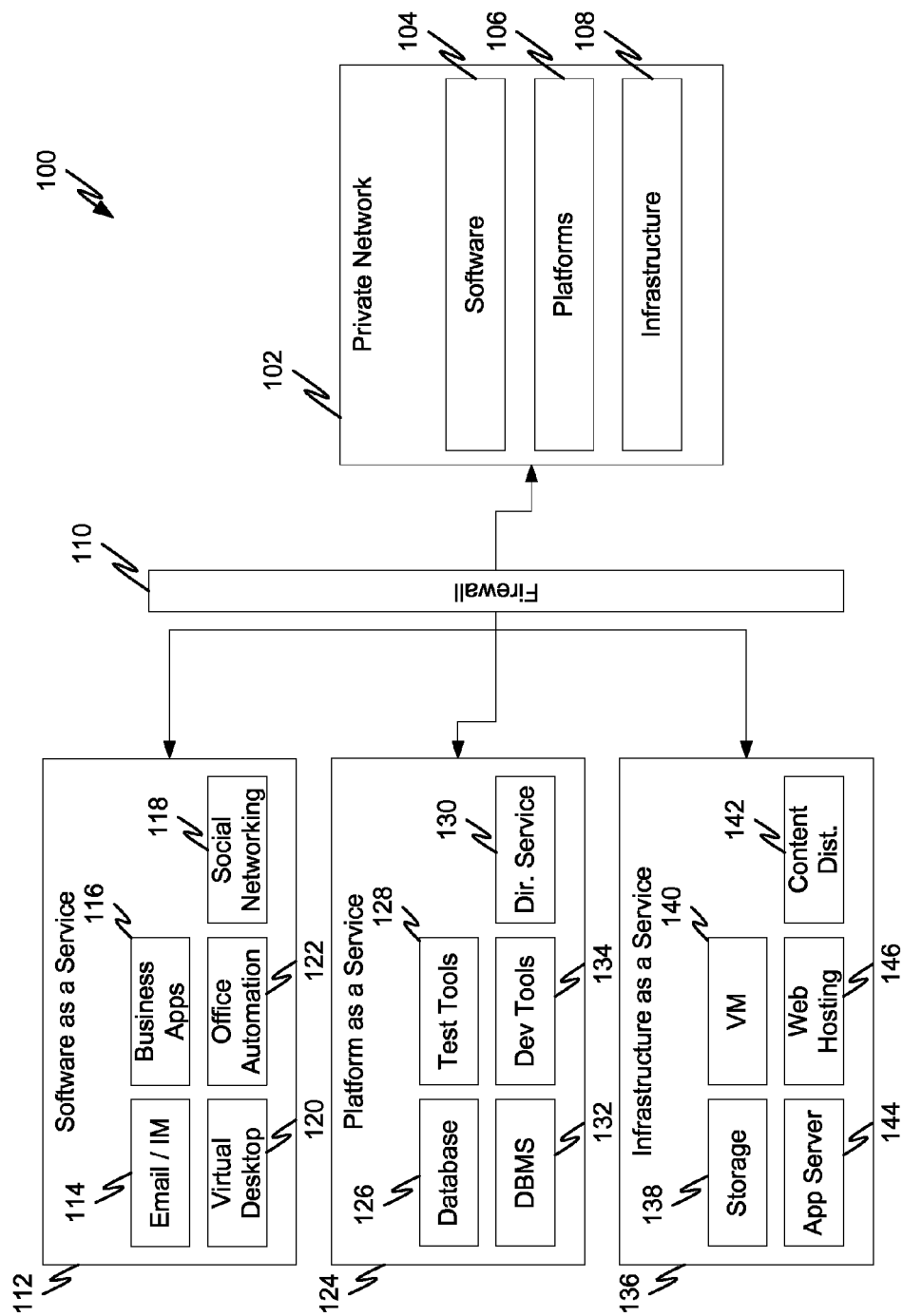
FIG. 1 is a diagram illustrating cloud service offerings and private networks.

FIG. 1 is a diagram illustrating cloud service offerings and private networks. For example, such an environment may be used in enterprise level applications. In such a situation, IT departments, users, system administrators, or others may rely on infrastructure, platforms, and/or software provided as part of cloud service offerings to implement and/or supplement various capabilities provided within private networks. In this context, "private networks" will be used to refer to on-premise type systems, services, software offerings, etc. while "cloud service offerings" will be used to refer to systems, services, software offerings, etc. provided by a third party, such as a cloud service provider.

While many different terms may be used to describe cloud service offerings and private networks, FIG. 1 illustrates an example embodiment of this disclosure. FIG. 1 illustrates an embodiment of cloud service offerings and private networks generally as 100. Embodiment 100 includes a private network 102. The private network 102 may include infrastructure 108, such as physical or virtual machines, storage, etc. connected, for example, by network or other connections. The private network 102 may also include various platforms 106, such as databases, database management systems, various development, testing, administrative, etc. tools, services, etc. The private network 102 may also include software 104, such as various programs, line of business applications, automation tools, email/instant messaging, collaboration tools, social networking, etc.

The private network 102 is often protected by technological measures to keep the network private and to prevent outside access by unauthorized entities. As used herein, entities include individuals (such as users, administrators, etc.) as well as programs, objects, machines (physical or virtual), systems, or other electronic entities. In the example embodiment of FIG. 1, such technological measures are represented by firewall 110. The firewall 110 may be configured to allow authorized entities access from outside the private network 102 through Virtual Private Network (VPN) technology or the like. However, opening the firewall 110 or other such technological measures and allowing outsiders to initiate contact with the private network 102 opens the private network 102 to various types of attack.

FIG. 1 illustrates various examples of cloud service offerings. Such offerings may be grouped into Infrastructure as a Service (IaaS) 136, Platform as a Service (PaaS) 124 and/or Software as a Service (SaaS) 112. IaaS 136 may include various infrastructure type offerings such as storage 138, virtual machines 140, content distribution 142, web hosting 146, application servers 144, etc. IaaS 136 may also include physical machines as well as virtual machines 140. PaaS 124 may include various platform type offerings such as a database 126, database management systems 132, testing tools 128, development tools 134, directory services 130, etc. SaaS 112 may include various software type offerings such as email/instant messaging 114, business applications 116, social networking 118, office automation 122, virtual desktops 120, etc. The various types of offerings illustrated in conjunction with IaaS 136, PaaS 124 and SaaS 112 are simply representative and other offerings may also be included and/or provided.

In many embodiments, cloud service offerings (such as those illustrated in FIG. 1) are used in conjunction with (or integrated with) offerings within the private network 102. For example, a business application within the private network 102 may work in conjunction with other business applications within a cloud offering, such as SaaS 112. In order to accomplish this, secure connections (sometimes referred to as a tunneled connection or "tunnel") are often established between the private network 102 and cloud service offerings. Secure connections are represented by arrows in FIG. 1.

One of the great advantages of cloud service offerings is that additional resources may be added or removed as demand increases or decreases. In some embodiments, adding and removing resources may be automatically accomplished in accordance with a demand. It can be difficult, when cloud resources are added and/or removed, to make sure that the secure connections are appropriately added and/or removed. Often, private networks (e.g., 102) leave mechanisms open within the firewall 110 so that newly added resources can be coupled to the private network 102 through newly created secure connections. This, however, leaves the private network 102 open to attack through these open mechanisms.

Figure 2:
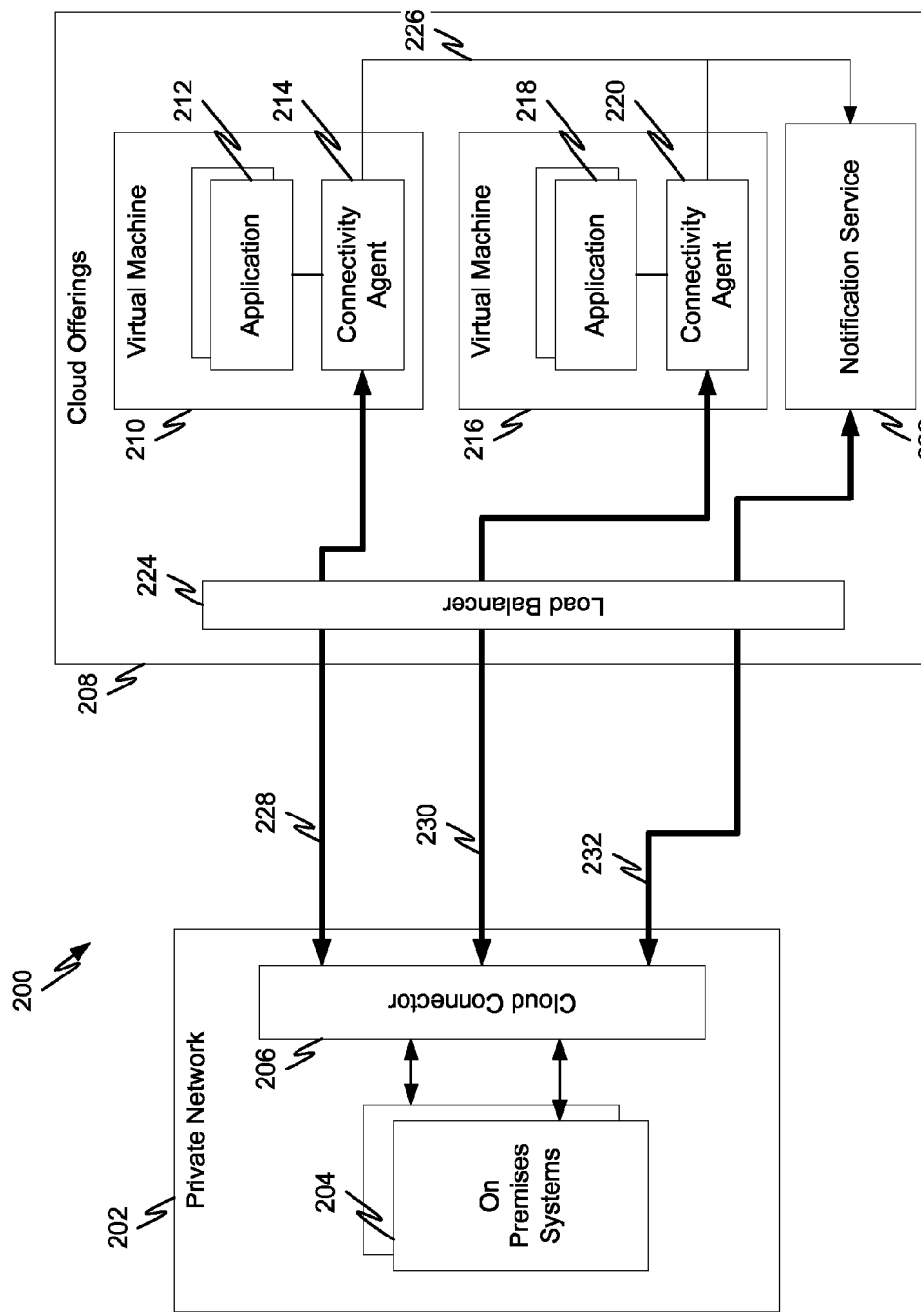
FIG. 2 is a diagram illustrating an exemplary embodiment using connectivity agents, a notification service and a cloud connector.

FIG. 2 is a diagram illustrating an exemplary embodiment using connectivity agents 214, 220, a notification service 222 and a cloud connector 206. Such an embodiment allows secure connections to be established and managed without opening a private network 202 up to the same types of attack that can happen as with other approaches. The embodiment of FIG. 2, shown generally as 200, may comprise cloud service offerings 208 that are used by or in conjunction with entities within the private network 202. These entities may be represented, for example, by on-premise systems 204, and may include various infrastructure, platform and/or software type entities.

In the embodiment 200 of FIG. 2, such entities (e.g., on-premise systems 204) are used with and/or interact with applications that are part of the cloud service offerings 208. In FIG. 2, such cloud service offerings 208 may include applications 212 and/or 218, shown as running within virtual machine 210 and 216, respectively. Although virtual machines 210, 216 are shown, other entities such as physical machines may be used instead of or in combination with the illustrated virtual machines 210, 216.

Cloud service offerings 208 may also include a load balancer 224. The load balancer 224 may ensure that loads between cloud resources are appropriately balanced, including providing new instances of virtual machines (e.g., 210, 216), applications (e.g., 212, 218), etc. as needed when loads increase and shutting down instances of virtual machines (e.g., 210, 216), applications (e.g., 212, 218), etc. as needed when loads decrease.

Since the on-premise systems 204 utilize applications 212 and/or 218, secure connections (e.g., 228, 230) may be established and managed between them. The cloud connector 206 may manage secure connections (e.g., 228, 230, 232) from within the private network 202. In accordance with the embodiment of FIG. 2, requests to establish a secure connection (e.g., 228, 230, 232) to the cloud service offerings 208 may be initiated from the cloud connector 206. In this manner, any security mechanism such as a firewall (not shown) need not be opened for connections to be initiated from outside the private network 202.

Upon startup, the cloud connector 206 may initiate contact with a notification service 222 and enter into a secure connection establishment procedure to establish a secure connection 232 between the cloud connector 206 and the notification service 222. Various embodiments may use different secure connection establishment procedures. In one embodiment, a procedure to establish a Secure Sockets Layer (SSL) connection is used. In another embodiment, Transport Layer Security (TLS) may be used to establish a secure connection. In other embodiments, other procedures may be used that result in a secure connection 232 between the notification service 222 and the cloud connector 206.

The embodiment 200 of FIG. 2 illustrates a connectivity agent 214 and a connectivity agent 220. In this representative embodiment 200, each virtual machine (e.g., 210, 216) has a connectivity agent (e.g., 214 and 220, respectively). In other embodiments, connectivity agents may be associated with a different "infrastructure" level, such as one connectivity agent for each application or other entity that communicates with the private network 202, one connectivity agent per physical system, one connectivity agent for the cloud 208 or set of cloud resources, etc.

Assuming an embodiment that has a per virtual machine connectivity agent, connectivity agent 214 and connectivity agent 220 may be part of the communication stack so applications (e.g., 212, 218) and other entities on virtual machines (e.g., 210, 216) can communicate with the private network 202 over secure connections (e.g., 228, 230, 232). Upon startup, the connectivity agent (e.g., 214, 220) will not have a secure connection (e.g., 228, 230) to the private network 202. When a secure connection (e.g., 228, 230) is needed (such as when an application, e.g., 212, 218, wants to send information to the private network 202), connectivity agent 214 and/or 220 may send a request to the notification service 222 to have the private network 202 open a secure connection (e.g., 228, 230) with the connectivity agent (e.g., 214, 220).

A request to open a secure connection (e.g., 228, 230) may contain a variety of information. In one embodiment, the request may include an identifier such as a URL, IP address (such as the IP address of the connectivity agent) or other routing information that will allow a secure connection (e.g., 228, 230) to be established with the requesting notification service 222. Other information that may be included is choice of protocol if the embodiment supports different secure connection establishment protocols, etc.

The notification service 222 may forward the request to the cloud connector 206 over the secure connection 232 between notification service 222 and the cloud connector 206. As explained in greater detail below, the cloud connector 206 may determine whether a secure connection (e.g., 228, 230) should be opened to the requesting entity. If so, the cloud connector 206 may use the information contained in the request to open a secure connection to the entity using a secure connection establishment procedure, such as SSL/TLS.

The following describes an example scenario where the embodiment 200 of FIG. 2 may be used. The example sequence of events illustrates how the various entities within the embodiment 200 may work together to integrate the on-premise systems 204 with cloud resources, such as applications 212 and 218.

The on-premise systems 204 may use cloud resources such as an application (e.g., 212, 218) to perform various functions. Alternatively, users of the private network may use cloud offerings (e.g., 212, 218) that need access to on-premise systems or information. In this representative example, application 212 represents such an application. When the on-premise systems 204 need to use application 212, the on-premise systems 204 starts up the cloud connector 206. The cloud connector 206 then uses previously obtained information to establish the secure connection 232 with the notification service 222. In this example, the cloud connector 206 initiates a secure connection establishment procedure with the notification service 222. The result of this procedure is that a secure connection 232 is established.

Application 212 may then be started, either through a request (not shown) or through some other mechanism. Usually cloud operators or cloud operations start application 212. In order to function properly, application 212 may need to access or communicate with the on-premise systems 204. Since a secure connection (e.g., 228, 230) has not been established between application 212 and the on-premise systems 204, a request may be sent from the notification service 222 to the cloud connector 206 to establish a secure connection (e.g., 228, 230). In one set of events, application 212 sends information to the connectivity agent 214 that should be sent to on-premise systems 204 over a secure connection (e.g., 228, 230). The connectivity agent 214 determines that a secure connection (e.g., 228, 230) does not yet exist and thus creates a request that a connection be opened. This request is forwarded to the notification service 222 as indicated by arrow 226.

Since a secure connection 232 may exist between the cloud connector 202 and the notification service 222, the request 226 may contain an ID of the secure connection. Thus, notification service 222 may check if there is a connectivity agent 214 connected for this secure connection ID and if there is, the notification service 222 may forward the request to cloud connector 206. If there is no cloud connector 206 for the requested secure connection ID, the notification may return an error response to the connectivity agent 214 indicating that such a secure connection cannot be opened. The application may responsible to send the secure connection ID together with the open connection request so the connectivity agent knows the secure connection ID.

As noted above, when an appropriate secure connection 232 exists between the notification service 222 and the cloud connector 206, the notification service 222, may forward the request to the cloud connector 206. The cloud connector 206 may check the request and determine whether to open a secure connection (e.g., 228, 230) or not based on a variety of factors such as whether the request comes from an authorized entity, whether the request is complete, whether the request comes from a trusted entity, whether the request complies with policies, etc. These checks may be performed by the cloud connector 206, by some other entity, or by some combination of the cloud connector 206 and some other entity.

Assuming the system decides to open the secure connection (e.g., 228, 230), the cloud connector 206 uses information in the request and any other information needed, to enter into a secure connection establishment procedure with the connectivity agent 214. The procedure may be initiated at the request of the cloud connector 206. The result of the procedure is that a secure connection 228 is established between the connectivity agent 214 and the cloud connector 206.

Once the secure connection 228 has been established, the connectivity agent 214 forwards information that application 212 has indicated should be sent to the on-premise systems 204 over the secure connection 228 to the cloud connector 206. The cloud connector 206 may, in turn, forward the information to the proper entity within the on-premise systems 204.

As another example, consider that the load balancer 224 decides to spawn another instance of application 212 to further distribute the load. In this example, application 218 may represent such an instance. Thus, application 218 may be started, perhaps in a separate virtual machine 216 as illustrated. When application 218 needs to send information to the on-premise system 204, it may open a secure connection (e.g., 228, 230) in the previously described manner. In other words, the connectivity agent 220 may identify the need for a secure connection (e.g., 228, 230) and create a request to open the secure connection (e.g., 228, 230). The request is then forward to the notification service 222, which forwards the request over the secure connection 232 to the cloud connector 206. After any appropriate checks are performed, the cloud connector 206 may initiate a secure connection establishment procedure with the connectivity agent 220 to establish a secure connection 230. The connectivity agent 220 may then send information as needed to the cloud connector 206 and may receive information in turn.

Figure 3:
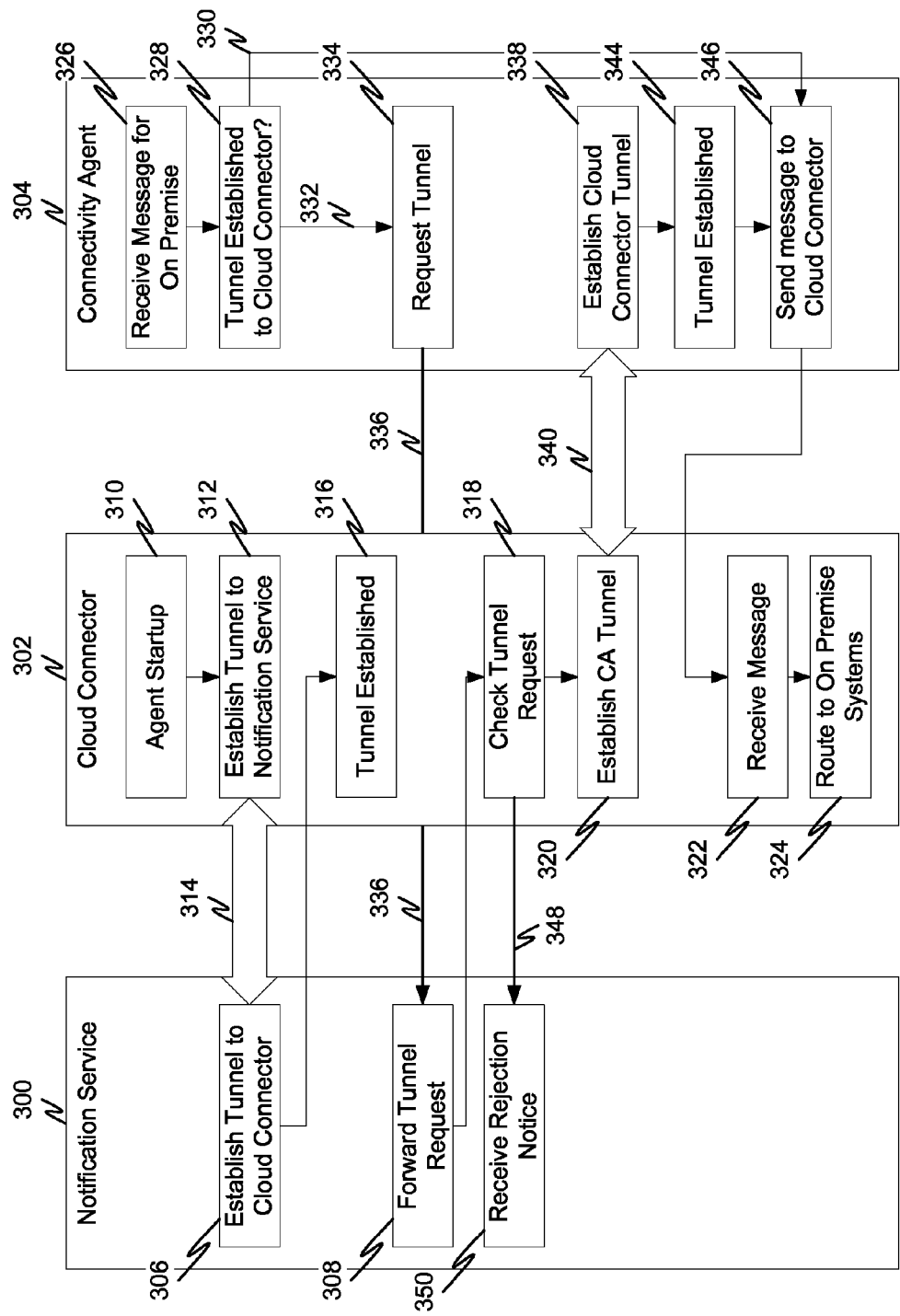
FIG. 3 is a diagram illustrating an exemplary interaction between a representative cloud connector, connectivity agent and notification service.

FIG. 3 is a diagram illustrating an exemplary interaction between a representative cloud connector 302, a connectivity agent 304 and a notification service 300. When the cloud connector 302 is started as indicated by block 310, the cloud connector 302 may initiate a secure connection to the notification service 300, which is indicated by block 312 and block 306 where the cloud connector 302 enters into a secure connection establishment procedure, as indicated by arrow 314, to established a secure connection. Once the procedure is complete, a secure connection exists between the cloud connector 302 and the notification service 300 as indicated by block 316.

The connectivity agent 304 may receive various messages and/or information for some entity within the private network, as indicated by block 326. The connectivity agent 304 checks to see whether a secure connection exists between the connectivity agent 304 and the cloud connector 302 as indicated by block 328. If so, then branch 330 is taken and the message is sent over the secure connection, as indicated by block 346. The cloud connector 302 receives the message as indicated by block 322 and routes the message (either directly or indirectly) to the appropriate entity, as indicated by block 324.

If a secure connection does not exist, then branch 332 is taken where a request is created and sent to the notification service 300, as indicated by block 334 and branch 336. The request may contain information needed to create the requested secure connection, such as an identifier or other information, which will provide the cloud connector 302 with information to initiate a secure connection establishment procedure with the connectivity agent 304. Such an identifier may include a URL or other routing type information.

The notification service 300 receives the request as indicated by block 308 and forwards the request to the cloud connector 302 over the previously established secure connection. The cloud connector 302 receives the request and initiates a check on the request to determine whether to initiate the requested secure connection as indicated by block 318. Such a check can take many forms, depending on the embodiment. In some embodiments, the cloud connector 302 may perform the check. For example, the cloud connector 302 may have a policy, list, etc. of authorized connections. For example, such a list can include the identity of the entities that are authorized to request a secure connection, routing information to which a connection will be established, or any other type of restrictions on connections such as date, time, originating location, etc. The check may be performed by the cloud connector 302, by a separate entity, or some combination thereof.

If the cloud connector 302 determines that a connection should not be established, a rejection may be sent back to the notification service 300 as indicated by branch 348 and block 350. Such a rejection may be simple, such as a "request rejected" notice or may be more detailed, such as including reasons why the request was rejected. The notification service 300 may then act on the rejection as appropriate by sending further notifications to the requestor that the request was denied, sending notification to a system administrator or other entity, etc.

If the cloud connector 302 accepts the request, the cloud connector 302 enters into a secure connection establishment procedure with the connectivity agent 304. This process is illustrated by block 320, arrow 340 and block 338.

The secure connection is established as represented by block 344. Once the requested secure connection is established, the message is sent over the secure connection as indicated by block 346. The cloud connector 302 receives the message as indicated by block 322 and routes the message (either directly or indirectly) to the appropriate entity as indicated by block 324.

Figure 4:
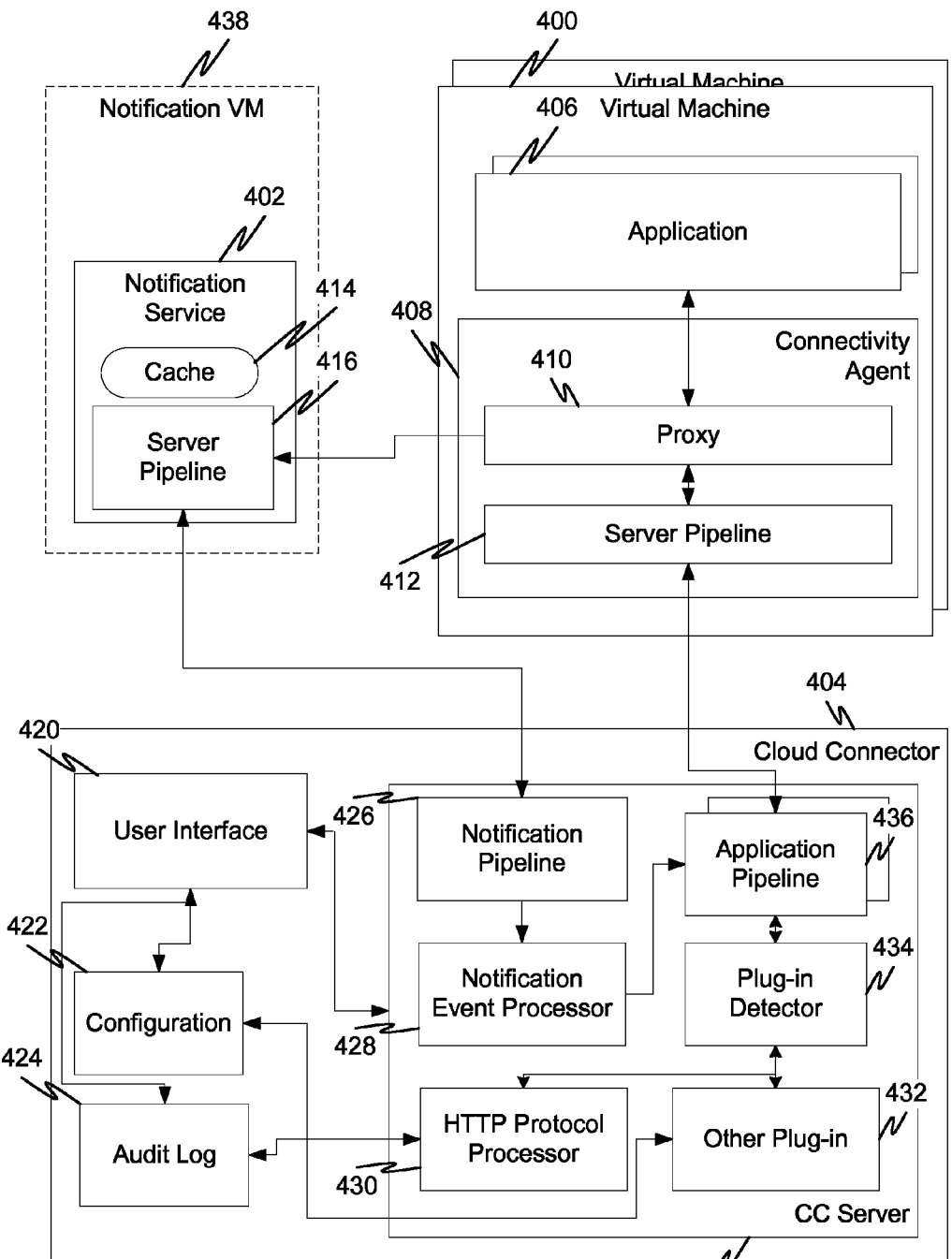
FIG. 4 is a diagram illustrating an exemplary embodiment using connectivity agents, a notification service and a cloud connector.

FIG. 4 is a diagram illustrating an exemplary embodiment using connectivity agent 408, a notification service 402 and a cloud connector 404. In this embodiment, cloud offerings include a notification service 402. The notification service 402 may execute within a virtual machine 438 as indicated. The notification service 402 may manage information flow over secure connections to one or more cloud connectors, such as the cloud connector 404. The notification service 402 may also participate in secure connection establishment procedures to establish secure connections to one or more cloud connectors, such as the cloud connector 404.

The notification service 402 may comprise a server pipeline 416 and cache 414. The server pipeline 416 receives information from connectivity agents, such as from the connectivity agent 408, discussed further below. The server pipeline 416 also receives information from, and transmits information to, the cloud connector 404 as discussed more fully below. The server pipeline 416 may also participate in a secure connection establishment procedure to establish a secure connection between the notification service 402 and the cloud connector 404. Cache 414 stores a variety of information relating to connections that the notification service 402 uses. In one embodiment, cache 414 keeps track of all secure connections that were established from cloud connectors to the notification service 402.

Cloud offerings may also include various applications or other entities used by the on-premise systems. Alternatively, cloud offerings may use various on-premise systems. Cloud offerings such as applications are illustrated in FIG. 4 by the applications 406. Such applications 406 or other entities may execute within one or more virtual machines, such as virtual machine 400. Applications 406 rely on a connectivity agent such as connectivity agent 408 to handle communication with the on-premise systems. Connectivity agent 408 may include a proxy 410 and a server pipeline 412. The proxy 410 provides access to the connection the application 406 uses to securely communicate with the on-premise systems. The proxy 410 may also request that a secure connection be established if one does not exist. The server pipeline 412 also receives information from, and transmits information to, the cloud connector 404. The server pipeline 412 may also participate in a secure connection establishment procedure to establish a secure connection between the connectivity agent 408 and the cloud connector 404.

The cloud connector 404 provides access to the on-premise systems or entities (not shown). The cloud connector 404 may also initiate and manage secure connections to cloud offerings. The cloud connector 404 may include a cloud connector server 418. The cloud connector server 418 may be responsible for establishing secure connections with cloud offerings as well as sending information to and receiving information from cloud offerings. The cloud connector server 418 also forwards information to and receives information from the on-premise systems or other entities (not shown).

The cloud connector server 418 may comprise a notification pipeline 426 which may manage information flow over secure connections with one or more notification services, such as the notification service 402. The notification pipeline 426 may also participate in a secure connection establishment procedure to establish a secure connection with a notification service, such as the notification service 402. The notification pipeline 426 may be connected to a notification event processor 428, which processes information and/or events received by the notification pipeline 426 and performs and/or coordinates actions in accordance with the information/events.

The cloud connector server 418 may also comprise an application pipeline 436. The application pipeline 436 may receive information from, and transmit information to, applications, such as the application 406, through connectivity agents, such as the connectivity agent 408. The application pipeline 436 may also participate in a secure connection establishment procedure to establish a secure connection between the connectivity agent 408 and the cloud connector 404.

As information is received and/or transmitted between the cloud connector 404 and the connectivity agent 408, plug-ins may be used to change the communication protocol stack in various ways. For example, plug-ins may be used to augment exiting protocol stack functionality or may be used to replace existing protocol stack functionality with other functionality. In this way, the communication protocol between the cloud connector 404 and cloud offerings may be upgraded, changed and/or modified in an easy fashion. Plug-ins may be detected by a plug-in detector 434, which can detect plug-ins and route information from/to the appropriate plug-in.

The cloud connector server 418 may also include an HTTP protocol processor 430 which implements the HTTP protocol within the cloud connector 404. In other words, the HTTP protocol processor 430 represents the HTTP protocol stack in the cloud connector 404. The HTTP protocol processor 430 may implement various layers of the protocol stack, such as SSL, TSL, etc. Other plug-ins 432 represents plug-ins that may be used in conjunction with and/or in place of the HTTP protocol processor 430.

The cloud connector 404 may also include a user interface 420. The user interface 420 provides a way for users, system managers, etc. (collectively referred to as users) to interact with the cloud connector 404 to accomplish various tasks or receive information about the state, status, etc. of the cloud connector 404. For example, the user interface 420 may allow a user to configure the cloud connector 404, establish policies for the cloud connector 404, manage plug-ins (e.g., 432), manage secure connections, etc.

Configuration 422 represents the configuration settings and/or policies for the cloud connector 404. The configuration 422 may represent, for example, plug-ins that are used in the cloud connector 404. The configuration 422 may also include information used to establish secure and manage secure connections to cloud offerings, such as how the cloud connector 404 should initiate contact with the notification service 402 upon startup to establish a secure connection with the notification service 402. The configuration 422 may also include policies that allow the notification event processor 428 to check secure connection requests to see if a request for a secure connection should be honored or rejected.

The cloud connector 404 may also include an audit log 424 to log various information and events within the cloud connector 404 for administration and reporting purposes.

In the embodiment of FIG. 4, the cloud connector 404, the connectivity agent 408 and the notification service 402 may perform functions such as those described in conjunction with FIG. 3, with the cloud connector 404 performing the functions laid out for the cloud connector 302; the connectivity agent 408 performing the functions laid out for the connectivity agent 304; and the notification service 402 performing those functions laid out for the notification service 300.

When the cloud connector 404 is started, the cloud connector 404 may initiate a secure connection to the notification service 402. Information may be sent via the notification pipeline 426 to the notification service 402 via the server pipeline 416 to have the notification service 402 and the cloud connector 404 enter into a secure connection establishment procedure, such as SSL and/or TSL, to establish a secure connection between the cloud connector 404 and the notification service 402. Once the procedure is complete, a secure connection exists between the cloud connector 404 and the notification service 402.

The connectivity agent 408 may receive various messages and/or information for some entity within the private network (e.g., on-premise systems, etc.) from the application 406. The application 406 uses the proxy 410 as the connection to the entity. The proxy 410 may check to see whether a secure connection exists between the connectivity agent 408 and the cloud connector 404. If so, then the message is sent to the server pipeline 412 and sent over the secure connection to the cloud connector 404. The application pipeline 436 receives the message and, using the plug-in detector 434, the HTTP protocol processor 430 and/or other plug-in 432 routes the message (either directly or indirectly) to the appropriate entity.

If a secure connection does not exist, then the proxy 410 creates a request to the cloud connector 404 to have the cloud connector 404 initiate a secure connection establishment procedure with the connectivity agent 408 to open a secure connection. Such a request may include, for example, the application that desires to use the secure connection, the routing information to the application, as well as any other information to open the appropriate secure connection.

The notification service 402 receives the request via the server pipeline 416 and forwards the request to the notification pipeline 426 over the previously established secure connection. The notification pipeline 426 receives the request and the notification event processor 428 initiates a check on the request to determine whether to initiate the requested secure connection. Such a check can take many forms, depending on the embodiment. For example, the notification event processor 428 may access a policy, list, etc. of authorized connections, in the configuration 422 or some other location. Such a list can include, for example, the identity of the entities that are authorized to request a secure connection, routing information to which a connection will be established (if any routing in the request is not used or if the request contains no routing information), or any other type of restrictions on connections such as date, time, originating location, etc. The check may be performed by the notification event processor 428, by a separate entity, or some combination thereof.

If the notification event processor 428 determines that a connection should not be established, a rejection may be sent back to the notification service 402 over the secure connection. Such a rejection may be simple, such as a "request rejected" notice or may be more detailed, such as including reasons why the request was rejected. The notification service 402 may then act on the rejection as appropriate by sending further notifications to the requestor that the request was denied, sending notification to a system administrator or other entity, etc.

If the notification event processor 428 accepts the request, the cloud connector 404 enters into a secure connection establishment procedure with the connectivity agent 408. In one embodiment, the notification event processor 428 may use the application pipeline 436 to initiate the secure connection establishment procedure.

Once the requested secure connection is established, the message is sent over the secure connection from the server pipeline 412 to the application pipeline 436. The application pipeline 436 receives the message and, using the plug-in detector 434, the HTTP protocol processor 430 and/or the other plug-in.

Although not shown in FIG. 2, 3 or 4, when a connection between a connectivity agent and a cloud connector has been idle for a period of time (which may be configurable), the connection may be closed. A protocol may be used so that one side (the connectivity agent or cloud connector) may send an intention to close the connection to the other side (cloud connector or connectivity agent, respectively). The other side may then detect the connection is about to close and may free resources that were used by the connection. If a secure connection is subsequently required, a new one can be reopened as explained above.

Figure 5:
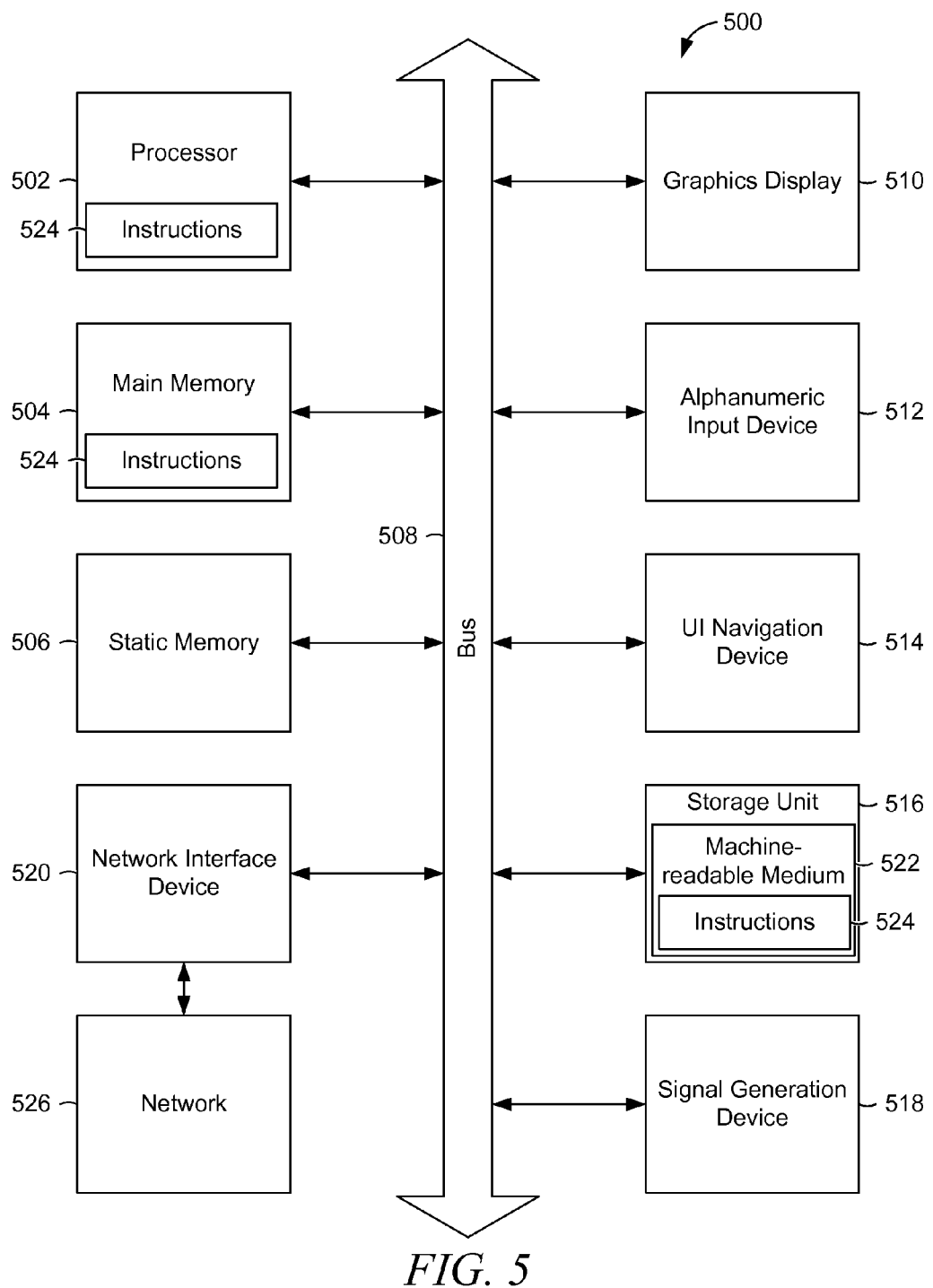
FIG. 5 is a block diagram of a computer processing system within which a set of instructions for causing the computer to perform any one or more of the methodologies discussed herein may be executed.

FIG. 5 is a block diagram of a computer processing system 500, within which a set of instructions 524 for causing the computer to perform any one or more of the methodologies discussed herein, may be executed.

In addition to being sold or licensed via traditional channels, embodiments may also, for example, be deployed by Software-as-a-Service (SaaS), Application Service Provider (ASP), or utility computing providers. The computer may be a server computer, a personal computer (PC), a tablet PC, a set-top box (STB), a personal digital assistant (PDA), cellular telephone, or any processing device capable of executing a set of instructions 524 (sequential or otherwise) that specify actions to be taken by that device. Further, while only a single computer is illustrated, the term "computer" shall also be taken to include any collection of computers that individually or jointly execute a set (or multiple sets) of instructions 524 to perform any one or more of the methodologies discussed herein.

The example computer processing system 500 includes a processor 502 (e.g., a central processing unit (CPU), a graphics processing unit (GPU), advanced processing unit (APU) or some combination thereof), a main memory 504 and static memory 506, which may communicate with each other via a bus 508. The computer processing system 500 may further include a graphics display 510 (e.g., a plasma display, a liquid crystal display (LCD) or a cathode ray tube (CRT) or other display). The processing system 500 may also include an alphanumeric input device 512 (e.g., a keyboard), a user interface (UI) navigation device 514 (e.g., a mouse, touch screen, or the like), a storage unit 516, a signal generation device 518 (e.g., a speaker), and/or a network interface device 520.

The storage unit 516 includes machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer processing system 500, with the main memory 504 and the processor 502 also constituting computer-readable, tangible media.

The instructions 524 may transmitted or received over a network 526 via a network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions 524. The term "machine-readable medium" shall also be taken to include any medium that is capable of storing, encoding or carrying a set of instructions 524 for execution by the computer and that cause the computer to perform any one or more of the methodologies of the present application, or that is capable of storing, encoding or carrying data structures utilized by or associated with such a set of instructions 524. The term "machine-readable medium" shall accordingly be taken to include, but not be limited to, solid-state memories, and optical and magnetic media. The term "machine-readable storage medium" does not include signals or other intangible mechanisms. Such intangible media will be referred to as "machine-readable signal media." The term "machine-readable media" will encompass both "machine-readable storage media" and "machine-readable signal media."

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, should not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A system comprising:
a memory;
a computer processor coupled to the memory;
instructions stored in the memory and executable by the processor, the instructions comprising:
a notification service configured to perform operations comprising:
engage, with a cloud connector at a request of the cloud connector, in a secure connection establishment procedure to establish a secure connection with the cloud connector;
receive, from a connectivity agent, a request to establish a second secure connection between the connectivity agent and the cloud connector; and
forward the request to the cloud connector; and
the connectivity agent configured to perform operations comprising:
receive, from a program, information to forward to an entity coupled to the cloud connector;
identify whether the second secure connection exists between the connectivity agent and the cloud connector;
when the second secure connection exists, send the information to the cloud connector over the second secure connection; and
when the second secure connection does not exist:
create a third request to establish the second secure connection between the connectivity agent and the cloud connector;
forward the request to the notification service;
engage in a second secure connection establishment procedure at the request of the cloud connector in order to establish the second secure connection between the connectivity agent and the cloud connector; and
send the information to the cloud connector over the second secure connection.

2. The system of claim 1, wherein the connectivity agent comprises:
a proxy configured to receive information from and send information to the program; and
a server pipeline configured to receive information from and send information to the cloud connector.

3. The system of claim 2, wherein the proxy is further configured to send a request to the notification service.

4. The system of claim 1, wherein the notification service is further configured to receive a second request from a second connectivity agent, the second request to establish a third secure connection between the second connectivity agent and the cloud connector.

5. The system of claim 1, wherein the connectivity agent is further configured to receive, from a second program, information to forward to the entity coupled to the cloud connector.

6. The system of claim 1, wherein the notification service is further configured to receive, from the cloud connector, a rejection of the request when the request is refused by the cloud connector.

7. A machine-readable storage medium comprising instructions that, when executed by at least one processor of a machine, configure the machine to perform operations comprising:
receive, from a program, information to forward to an entity coupled to a cloud connector;
identify whether a secure connection exists between a connectivity agent and the cloud connector;
when the secure connection exists, send the information to the cloud connect over the secure connection; and
when the secure connection does not exist:
create a request to establish the secure connection between the connectivity agent and the cloud connector;
forward the request to a notification service;
engage in a secure connection establishment procedure at the request of the cloud connector in order to establish the secure connection between the connectivity agent and the cloud connector; and send the information to the cloud connector over the secure connection.

8. The machine-readable storage medium of claim 7, wherein the instructions further configure the machine to perform operations comprising:
receive, from the connectivity agent, the request to establish a second secure connection between the connectivity agent and the cloud connector;
forward the request to the cloud connector; and
engage, with the cloud connector at the request of the cloud connector, in a second secure connection establishment procedure to establish the second secure connection with the cloud connector.

9. The machine-readable storage medium of claim 8, wherein the secure connection establishment procedure is the same as the second secure connection establishment procedure.

10. The machine-readable storage medium of claim 8, wherein the cloud connector is located within a private network.

11. The machine-readable storage medium of claim 7, wherein the instructions that configure the machine to perform operations comprising:
receive, from a second program, information to forward to a second entity coupled to the cloud connector;
identify whether a second secure connection exists between a second connectivity agent and the cloud connector;
when the second secure connection exists, send the information to the cloud connector over the second secure connection via the second connectivity agent; and
when the second secure connection does not exist:
create a second request to establish the second secure connection between the second connectivity agent and the cloud connector;
forward the second request to the notification service;
engage in a second secure connection establishment procedure at the request of the cloud connector in order to establish the second secure connection between the second connectivity agent and the cloud connector; and
send the information to the cloud connector over the second secure connection via the second connectivity agent.

12. The machine-readable storage medium of claim 11, wherein the connectivity agent and the notification service reside in separate virtual machines within the cloud network.

* * * * *